United States Patent Office 3,784,588
Patented Jan. 8, 1974

3,784,588
ACRYLATE ADDITION PRODUCTS OF DIALKYL PHOSPHORODITHIOIC ACIDS
Peter Miles, Moston, England, assignor to Ciba-Geigy AG, Basel, Switzerland
No Drawing. Filed Jan. 19, 1971, Ser. No. 107,827
Claims priority, application Great Britain, Jan. 29, 1970, 4,296/70
Int. Cl. C07f 9/16; C10m 1/78
U.S. Cl. 260—928                    13 Claims

ABSTRACT OF THE DISCLOSURE

Esters of S-alkylcarboxylic derivatives of O,O-dihydrocarbyl phosphorodithioic acids are used as antioxidants and extreme pressure additives for lubricants. The esters are prepared by reacting an O,O-dihydrocarbyl phosphorodithioic acid with an acrylate.

DETAILED DISCLOSURE

The present invention relates to novel chemical compounds, more particularly the addition products of O,O-dialkyl phosphorodithioic acids to certain synthetic esters and their use in lubricating oils.

According to the present invention there is provided a compound having the formula:

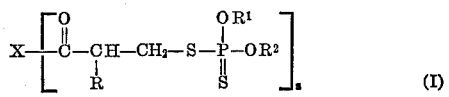
(I)

wherein

R is hydrogen or an alkyl radical containing from 1 to 3 carbon atoms, $R^1$ and $R^2$ are the same or different and may be a hydrocarbyl radical containing from 1 to 20 carbon atoms unsubstituted or substituted by one or more halogen, alkyl having 1 to 4 carbon atoms or alkoxy having 1 to 4 carbon atoms, z is an integer from 1 to 6, preferably 2 to 4, and X is an alkoxy radical derived from an aliphatic alcohol having from 2 to 20, preferably 4 to 6 carbon atoms and containing from 1 to 6, preferably 2 to 4 hydroxyl groups.

When z is 1, X may be a monovalent radical having the formula:

$$C_nH_{2n+1}O—$$    (II)

derived from a monohydric alcohol wherein n is an integer from 2 to 20.

When z is 2, X may be a divalent radical having the formula:

$$—OC_mH_{2m}O—$$    (III)

derived from a dihydric alcohol wherein n is an integer from 2 to 6.

When z is 3, X may be a trivalent radical having the formula:

(IV)

derived from a trihydric alcohol wherein $R^3$ is hydrogen or an alkyl radical containing up to 6 carbon atoms.

When z is 4, X may be a tetravalent radical having the formula:

(V)

derived from pentaerythritol.

When z is 6, X may be a hexavalent radical having the formula:

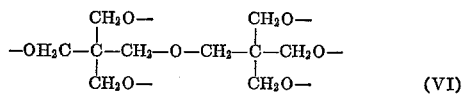
(VI)

derived from dipentaerythritol.

Where the grouping X is a monovalent radical having the Formula II, examples of monohydric alcohol from which it may be derived are ethanol, isopropanol, butanol, isobutanol, hexanol, octanol, isooctanol, decanol, dodecanol, octadecanol or docosanol.

Where the grouping X is a divalent radical having the Formula III, examples of dihydric alcohols from which it may be derived are ethylene glycol, 1,2-propylene glycol, 1,3-butylene glycol, 1,4-butylene glycol, 1,6-hexane diol and 2,2-dimethyl propane 1,3-diol.

Where the grouping X is a trivalent radical having the Formula IV, examples of trihydric alcohols from which it may be derived are trimethylol propane, trimethylol ethane and trimethylol methane.

Although R may, if desired be a methyl radical it is preferably hydrogen. The groupings $R^1$ and $R^2$ are preferably alkyl having 1 to 20, preferably 1 to 16 carbon atoms, cycloalkyl having 5 to 8 carbon atoms, aryl or aralkyl having each 6 to 20 carbon atoms, which can be substituted by alkyl having 1 to 4 carbon atoms or halogen and where $R^1$ and $R^2$ are the same they may each be, for instance, a methyl, ethyl, propyl, isooctyl, capryl, isodecyl, tridecyl, cetyl, cyclopentyl, cyclohexyl, phenyl, benzyl, naphthyl, 2,4,6-triisopropyl phenyl, 2,4,6-trichlorophenyl, p-chloro-phenyl or 2,4-diisopropyl phenyl. Where $R_1$ and $R^2$ are different one may be, for instance, an ethyl, propyl or isopropyl radical, the other being an isooctyl, isodecyl or capryl radical.

The compounds of the present invention are provided by reacting an O,O-dihydrocarbyl phosphorodithioic acid having the formula:

(VII)

with a compound having the formula:

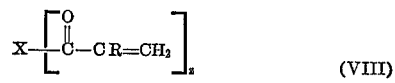
(VIII)

wherein X, R, $R_1$, $R_2$ and z have their previous significance. The compound having the Formula VIII may be, for instance, 1,3-butylene glycol diacrylate, trimethylolpropane triacrylate or pentaerythritol tetraacrylate.

The reaction may conveniently be carried out by adding over a period of time either component to the other with stirring preferably in the presence of an inert organic solvent, for instance benzene, toluene, or methylene chloride. The addition is preferably carried out at an elevated temperature, for instance at reflux. The reaction mixture may then be refluxed over a further period of time, for instance from 1 to 4 hours. The product may then be cooled and neutralized, for instance by washing with aqueous sodium carbonate and then, if desired, with brine. The solvent may then be removed by evaporation and then, if desired, the product may be steam distilled. The product may afterwards be purified by conventional techniques, for instance by filtering.

The compound having the Formula VII may conveniently be prepared by heating phosphorous pentasulphide with an alcohol, if desired in the presence of a catalyst, for instance powdered sodium hydroxide. The reaction may take place in the absence of solvent or, if desired, in the presence of an organic solvent which is inert under the conditions of the reaction. Where either or both $R^1$ and $R^2$ in the compound of Formula VII contain 8 or more carbon atoms, this compound may conveniently be prepared by reacting, for instance, O,O-diethyl or O,O-diisopropyl phosphorodithioic acid with the appropriate amount of alcohol containing 8 or more carbon atoms. The solution of the compound of Formula VII in an inert organic solvent thus prepared may be reacted directly with the compound of Formula VIII.

The compound of Formula VIII may, if desired, be prepared by the reaction of the appropriate alcohol with the required amount of an $\alpha,\beta$-unsaturated carboxylic acid.

The compounds of the present invention are especially useful as antioxidants and extreme pressure additives for lubricants, co-stabilizers for light protecting systems, and are also useful as insecticides. Furthermore some compounds are useful as citrus abscission agents, specific examples being the compounds having the formulae:

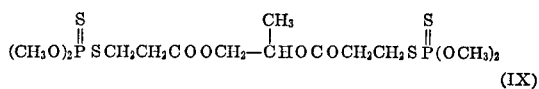

(IX)

and

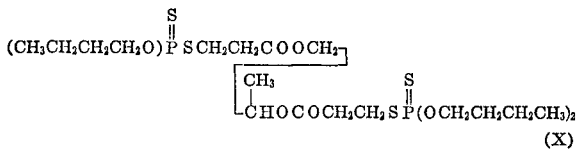

(X)

The present invention therefore also provides a composition comprising a lubricating oil and a compound having the Formula I.

The lubricating oil may be a mineral or synthetic oil or may be a mixture of mineral and synthetic lubricating oils.

The lubricating oils may contain an amount of the compound of Formula I within the range of form 0.001% to 5% but preferably within the range of from 0.1% to 3% by weight based on the total weight of lubricating oil.

The lubricating oil, may, if desired, contain in addition other additives which are conventionally added to improve the properties thereof, such as antioxidants, metal passivators, rust inhibitors, viscosity index improvers/pour point depressants, dispersants/detergents and other extreme pressure/antiwear additives.

Examples of antioxidants are:

(a) Alkylated and non-alkylated aromatic amines and mixtures thereof, for example dioctyldiphenylamine; mono-t-octylphenyl-$\alpha$ and $\beta$-naphthylamines; dioctylphenothiazine; phenyl-$\alpha$-naphthylamine; N,N'-di-sec butyl p-phenylenediamine.

(b) Hindered phenols, for example 2,6-ditertiarybutyl-p-cresol; 4,4'-bis-(2,6-diisopropylphenol); 2,4,6-triisopropylphenol; 2,2'-thio-bis - (4-methyl - 6-tertbutylphenol).

(c) Alkyl, aryl or alkaryl phosphites, for example triphenylphosphite; trinonylphosphite; diphenyldecylphosphite.

(d) Esters of thiodipropionic acid, for example dilaurylthiodipropionate.

(e) Salts of carbamic and dithiophosphoric acids, for example antimony diamyldithiocarbamate, zinc diamyldithiophosphate.

(f) Metal salts, complexes of organic chelating agents for example copper bis(trifluoroacetylacetonates), copper phthalocyanines, tributyl ester of EDTA, mono sodium salt.

(g) Free radical antioxidants for example nitroxides, etc.

(h) Combinations of two or more antioxidants from any of the above sections, for example an alkylated amine and a hindered phenol.

Examples of metal passivators are:

(a) for copper, for example 1,2,4-triazole benzothiazole, 5,5'-methylene - bisbenzotriazole, tetrahydrobenzotriazole, 2,5-dimercaptothiadiazole, salicylidene-propylenediamine, salts of salicylalaminoguanidine;

(b) for magnesium, for example pyridylamines (c) for lead, for example sebacic acid, quinizarin, propyl gallate (d) combinations of two or more of the above additives.

Examples of rust inhibitors are:

(a) Organic acids, and their esters, metal salts, anhydrides for example N-oleoyl sarcosine, sorbitan monooleate, lead naphthenate, dodecenylsuccinic anhydride.

(b) Nitrogen containing materials, for example
 (i) primary, secondary or tertiary aliphatic or cycloaliphatic amines and amine salts of organic and inorganic acids, for example morpholine, stearyl amine, triethanolamine caprylate.
 (ii) heterocyclic compounds, for example imidazolines, oxazolines.

(c) Phosphorus containing materials, for example inorganic phosphates, phosphonic acids, amine phosphates.

(d) Sulphur containing materials, for example barium dinonylnaphthalene sulphonates.

(e) Combinations of two or more of the above additives.

Examples of Viscosity Index Improvers/Pour Point Depressants are, for example: polyacrylates, polybutenes, polyvinyl pyrrolidones.

Examples of Dispersant/Detergents are, for example: metal sulphonates (Ca, Ba, Mg) and phenates, polybutenyl succinimides.

Examples of Extreme Pressure/Antiwear additives are: sulphur and/or phosphorus and/or halogen containng materials, for example sulphurized sperm oil, zinc dialkyl phosphoro dithioates, tritolylphosphate, chlorinated paraffins.

The present invention also provides a process of producing compositions of lubricating oils comprising a functionally effective proportion of a compound having Formula I, which comprises admixing the organic material with the compound having the Formula I.

The following examples further illustrate the present invention. Parts by weight shown therein bear the same relation to parts by volume as do kilograms to litres. Parts and percentages are expressed by weight unless otherwise stated.

EXAMPLE 1

111 parts of phosphorus pentasulphide and 200 parts by volume of benzene were charged into a reaction vessel fitted with a stirrer, condenser, dropping funnel and thermometer. 64 parts of methanol were added at reflux over a period of three hours and the reaction mixture allowed to reflux for a further 2½ hours after which time the phosphorus pentasulphide had reacted. The resulting solution was found to contain 84.1 parts of O,O-dimethyl phosphorodithioic acid, the yield being 54%.

35.2 parts of trimethylolpropane triacrylate in 100 parts by volume of benzene were added dropwise at reflux with stirring over a period of one hour to 73.6 parts of O,O-dimethyl phosphorodithioic acid in benzene prepared as above. The reaction was refluxed for a further 3 hours. The mixture was then cooled and 250 parts by volume of ether were added. The solution was washed with a 10% solution of sodium carbonate, then with water until neutral. The solution was then dried, the solvent evaporated off and the oily product, yellow in color having the Formula I wherein X is:

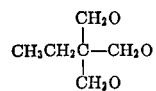

R is hydrogen, $R^1$ and $R^2$ are both methyl and z is 3, was filtered through a sinter plate with Hyflo as filtering aid to give 60 parts of product. The yield was 70.5% and the analysis was as follows:

Calculated (percent): C, 32.7; H, 5.3; P, 12.1. Found (percent): C, 32.8; H, 5.3; P, 12.0.

EXAMPLES 2 TO 7

By following essentially the same procedure described in Example 1 but using, instead of the methanol there used, an appropriate amount of the alcohols listed in Table I, and then using an appropriate amount of the O,O-dialkyl phosphorodithioic acid thus prepared instead of O,O-dimethyl phosphorodithioic acid further trimethylolpropane triacrylate derivates were obtained, the yields being shown in Table I. In Examples 5, 6 and 7 the solution was steam distilled after washing.

TABLE I

| Ex. | Alcohol | Parts | O,O-dialkyl phosphorodithioic acid | Parts acid | Parts of T.M.P. triacrylate | Yield, percent |
|---|---|---|---|---|---|---|
| 2 | Ethanol | 92 | O,O-diethyl | 102.3 | 39.13 | 53 |
| 3 | Isopropanol | 120 | O,O-diisopropyl | 85.1 | 29.6 | 92 |
| 4 | n-Butanol | 148 | O,O-di-n-butyl | 93.8 | 29.6 | 74 |
| 5 | Cyclohexanol | 200 | O,O-dicyclohexyl | 114.6 | 32.56 | 30 |
| 6 | Isooctanol | 260 | O,O-diisooctyl | 137.4 | 29.6 | 80 |
| 7 | Isodecanol | 316 | O,O-diisodecyl | 168 | 29.6 | 57.5 |

EXAMPLE 8

42.4 parts of pentaerythritol tetraacrylate in 100 parts by volume of benzene were added dropwise at reflux with stirring to 94.8 parts of O,O-dimethyl phosphorodithioic acid in benzene prepared as in Example 1. The reaction mixture was refluxed for three hours, then cooled and 250 parts by volume of ether added. The solution was washed with 10% solution of sodium carbonate and then with water until neutral. The solution was then dried and the solvent evaporated off. The oily product was filtered through a sinter plate with Hyflo to give 72.1 parts of product having the Formula I wherein X is

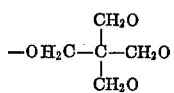

R is hydrogen, $R^1$ and $R^2$ are both methyl and z is 4. The yield was 61.1% and the analysis was as follows:

Calculated (percent): C, 30.5; H, 4.9; P, 12.4. Found (percent): C, 30.4; H, 4.9; P, 12.3.

EXAMPLES 9 TO 14

By following essentially the same procedure as that described in Example 8 but using, instead of the O,O-dimethyl phosphorodithioic acid there used, an appropriate amount of the O,O-dialkyl phosphorodithioic acid prepared as in Examples 2 to 7, further pentaerythritol tetraacrylate derivatives were obtained, the yields being as shown in Table II. In Examples 12, 13 and 14 the solution was steam distilled after washing.

TABLE II

| Example | O,O-dialkyl phosphorodithioic acid | Parts acid | Parts pentaerythritol tetraacrylate | Yield, percent |
|---|---|---|---|---|
| 9 | O,O-diethyl | 98.6 | 41.24 | 51 |
| 10 | O,O-diisopropyl | 100.5 | 35.2 | 54 |
| 11 | O,O-di-n-butyl | 96.3 | 35.2 | 54.5 |
| 12 | O,O-dicyclohexyl | 123.5 | 33.4 | 43 |
| 13 | O,O-diisooctyl | 126 | 24.6 | 64.7 |
| 14 | O,O-diisodecyl | 164 | 28.2 | 48 |

EXAMPLE 15

111 parts of phosphorus pentasulphide and 188 parts of phenol were charged into a reaction vessel fitted with a stirrer, air condenser and thermometer. The reactants were heated at 130° to 140° C. for 2 hours during which time the mixture became clear. The product was cooled and became solid. The solid product was then refluxed with 150 parts by volume of petroleum ether (boiling at 60° to 80° C.) and benzene added slowly until the product just went into solution. The solution was treated with 5 parts of carbon and then filtered and cooled. The product crystallized and was filtered under water pump vacuum and rinsed with 200 parts by volume of petroleum ether (boiling at 60° to 80° C.). After drying 175.5 parts of a white fluffy solid was obtained having a melting point of 59.5° to 61.5° C. The yield of the O,O-diphenyl phosphorodithioic acid thus produced was 62%.

79 parts of O,O-diphenyl phosphorodithioic acid as prepared above were dissolved in 200 parts by volume of toluene and charged into a reaction vessel. 23.7 parts of trimethylolpropane triacrylate in 100 parts by volume of toluene were added over a period of 30 minutes at reflux with stirring and the reaction mixture was refluxed for a further 2 hours. The mixture was washed with a 10% solution of sodium carbonate and then with brine, dried and the solvent evaporated off. It was filtered through a sinter plate and Hyflo to give 67 parts of a light brown viscous oil, having the Formula I wherein X is:

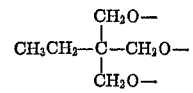

R is hydrogen, $R^1$ and $R^2$ are both phenyl and z is 3. The yield was 72.5%.

EXAMPLE 16

By following essentially the same procedure as described in Example 15 but firstly preparing O,O-di-[2:4:6 triisopropylphenyl] phosphorodithioic acid by using, instead of the phenol there used, an appropriate amount of 2:4:6-triisopropylphenol in the presence of 0.2 part of powdered sodium hydroxide catalyst, and then using 103.3 parts of the O,O-di-[2,4,6-triisopropylphenyl] phosphorodithioic acid thus prepared instead of the O,O-diphenyl phosphorodithioic acid there used, and 14.8 parts of trimethylolpropane triacrylate instead of the 23.68 parts there used, the corresponding trimethylol triacrylate derivative was obtained.

EXAMPLE 17

93 parts of O,O-diethyl phosphorodithioic acid prepared as in Example 9 and 250 parts by volume of toluene were charged into a reaction vessel and refluxed at 110° C. Tridecanol was added and the reflux temperature dropped to 76° C. as the ethanol was removed azeotropically. On completion of the addition, the temperature rose steadily to 110° C. The mixture was allowed to reflux for a further hour whereupon 247 parts of O,O-di-tridecyl phosphorodithioic acid were found to be present in the toluene in the reaction vessel. The yield was 97%.

197.6 parts of the O,O-di-tridecyl phosphorodithioic acid as prepared above were charged along with 200 parts by volume of toluene into a reaction vessel and 35.5 parts of trimethylol propane triacrylate in 100 parts by volume of toluene were added over 2 hours at reflux and the mixture refluxed for a further three hours. The product was washed with a 10% solution of sodium carbonate then with brine until neutral, the solvent evaporated off and the product steam distilled. It was then filtered through a sinter with Hyflo to give 182 parts of product having the Formula I wherein X is:

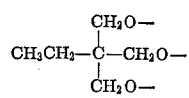

R is hydrogen, $R^1$ and $R^2$ are both tridecyl and z is 3. The yield was 84% and the analysis was as follows:

Calculated (percent): C, 62.7; H, 10.4; P, 5.2. Found (percent): C, 64.9; H, 10.9; P, 5.2.

EXAMPLES 18 TO 22

By following essentially the same procedure to that described in Example 17 but using, instead of the tridecanol there used, the alcohol listed in Table III to give the corresponding O,O-dialkyl phosphorodithioic acid and then reacting this acid with either trimethylolpropane triacrylate or pentaerythritol tetraacrylate, the corresponding ester derivatives were obtained, the yield being given in the following Table III.

TABLE III

| Ex. | Alcohol | O,O-dialkyl phosphorodithioic acid | Parts | Ester | Parts | Yield, percent |
|---|---|---|---|---|---|---|
| 18 | Capryl alcohol | O,O-dicapryl | 141 | TMP triacrylate | 29.6 | 53 |
| 19 | Cetyl alcohol | O,O dicetyl | 108.6 | TMP triacrylate | 17.76 | 80.4 |
| 20 | Tridecanol | O,O-ditridecyl | 247 | Pentaerythritol tetraacrylate | 38.72 | 47.4 |
| 21 | Capryl alcohol | O,O-dicapryl | 173 | do | 38.72 | 43.8 |
| 22 | Cetyl alcohol | O,O-dicetyl | 132.9 | do | 17.6 | 30.8 |

EXAMPLE 23

85.6 parts of O,O-diisopropyl phosphorodithioic acid as prepared in Example 10 were charged into a reaction vessel along with 250 parts by volume of toluene. The appropriate amount of isooctanol was added to form O-isopropyl O-isooctyl phosphorodithioic acid, 110.2 parts of which were obtained, the yield being 97%.

110.2 parts of O-isopropyl O-isooctyl phosphorodithioic acid were reacted with 29.6 parts of trimethylolpropane triacrylate by a substantially similar procedure to that described in Example 17 to give the corresponding trimethylolpropane triacrylate derivative having the Formula I wherein X is:

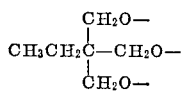

R is hydrogen, $R^1$ is isopropyl and $R^2$ is isooctyl and z is 3. The yield was 90%.

EXAMPLES 24 TO 31

By following essentially the same procedure to that described in Example 23 but preparing the O,O-dialkyl phosphorodithioic acids listed in Table IV by reacting O,O-diethyl or O,O-diisopropyl phosphorodithioic acid with capryl, isodecyl or isooctyl alcohol and then reacting with either trimethylolpropane triacrylate or pentaerythritol tetraacrylate, the corresponding ester derivative was produced the yields being given in Table IV.

TABLE IV

| Ex. | O,O-dialkyl phosphorodithioic acid | Parts | Ester | Parts | Yield, percent |
|---|---|---|---|---|---|
| 24 | O-isopropyl / O-capryl | 113.6 | TMP triacrylate | 29.6 | 77.5 |
| 25 | O-isopropyl / O-isodecyl | 91.4 | do | 23.68 | 60 |
| 26 | O-ethyl / O-isodecyl | 119.2 | do | 29.6 | 60 |
| 27 | O-ethyl / O-isooctyl | 108 | do | 29.6 | 57.3 |
| 28 | O-ethyl / O-capryl | 108 | do | 29.6 | 61 |
| 29 | O-isopropyl / O-isooctyl | 110.7 | Pentaerythritol tetraacrylate | 28.16 | 40.5 |
| 30 | O-isopropyl / O-capryl | 113.8 | do | 28.16 | 32.1 |
| 31 | O-isopropyl / O-isodecyl | 124.8 | do | 28.16 | 41.4 |

EXAMPLE 32

39.6 parts of 1,3-butylene glycol diacrylate were added dropwise in 200 parts by toluene at reflux over a period of 1 hour to 103 parts of O,O-diisopropyl phosphorodithioic acid in benzene. The mixture was refluxed for a further 3 hours. The mixture was then cooled and 250 parts by volume of ether were added. The solution was washed with 10% sodium carbonate solution, then with water until neutral. The solvent was then evaporated off and the oily product filtered with carbon through a sinter plate with Hyflo to give 104 parts of product. The yield was 839 and the analysis was as follows:

Calculated (percent); C, 42.2; H, 7.0; P, 9.9; S, 20.4. Found (percent): C, 42.11; H, 6.7; P, 9.2; S, 22.0.

EXAMPLE 33

39.6 parts of 1,3-butylene glycol diacrylate were added in 200 parts by volume of toluene to 147 parts of O,O-dicyclohexyl phosphorodithioic acid in benzene at reflux over 1 hour. The reaction was continued at reflux for a further 3 hours. The mixture was then cooled and 200 parts by volume of ether were added. The mixture was then washed with 10% sodium carbonate solution, then with water until neutral. The solution was dried and the solvent distilled off. The oily product was filtered through a sinter plate using Hyflo and carbon to give 66.8 parts of product. The yield was 42.5% and the analysis was as follows:

Calculated (percent): C, 52.0; H, 7.6; P, 7.9; S, 16.8. Found (percent): C, 52.0; H, 7.7; P, 7.7; S, 16.3.

EXAMPLE 34

The following example illustrates the use of the compounds of Formula I of the present invention as extreme pressure additives for lubricating oils.

The compounds having the Formula I when added in small quantities to lubricating oils (which can be naturally occurring or synthetic or mixtures of these, have been shown to provide increased load carrying and anti-wear properties. In other words they are useful as extreme-pressure/anti-wear additives.

The well-known Shell 4-Ball Lubricant Testing Apparatus was used to measure the Mean Hertz Load of Puermor 210 (a light refined mineral oil) with and without the addition of the compounds of Formula I of the present invention. This apparatus consists essentially of a half-inch diameter steel ball which is rotated at a speed of 1,420 revolutions per minute in contact with three similar balls held stationary in a test cup, by means of a clamping ring and nut, and immersed in the oil under test. A lever system exerts a known, variable force (applied load) between the stationary balls and the rotating ball. During the test small circular scars are worn on each of the fixed balls and the size of these scars gives an indication of the load carrying and antiwear properties of the lubricant.

The Mean Hertz Load is obtained from a series of test runs carried out at twenty different specified loadings and is the average of these loads corrected for the difference between the actual diameters of the wear scars formed and the Hertz diameter which is the area of contact between the balls under static load.

TABLE V

| Additive used | Concentration, percent | Mean Hertz Load (kilograms) |
|---|---|---|
| None | | 14.7 |
| Product of Example: | | |
| 3 | 2 | 51.0 |
| 4 | 2 | 39.8 |
| 5 | 2 | 54.0 |
| 6 | 2 | 36.1 |
| 6 | 3 | 32.3 |
| 7 | 2 | 34.5 |
| 10 | 2 | 42.3 |
| 11 | 2 | 32.1 |
| 12 | 2 | 35.2 |
| 14 | 2 | 38.0 |
| 21 | 2 | 42.9 |

The results obtained from tests carried out on the compounds of Formula I of the present invention are shown in Table V. They clearly indicate the beneficial effect of adding the compounds of the present invention to the oil.

EXAMPLE 35

The test carried out in Example 34 was repeated to illustrate the use of compounds of Formula I of the present invention as extreme pressure additives for lubricating oils but instead of the Mean Hertz Load, the Load Wear Index was determined. The Load Wear Index is a modification of the Mean Hertz Load where the corrected loads up to the incipient seizure load are calculated from tables as per method ASTM D2596. The results are given in Table VI.

TABLE VI

| Additive used | Concentration, percent | Load Wear Index (kilograms) |
|---|---|---|
| None | | 17.2 |
| Product of Example: | | |
| 17 | 2 | 33.8 |
| 18 | 2 | 31.25 |
| 19 | 2 | 28.4 |
| 20 | 2 | 39.3 |
| 22 | 2 | 34.2 |
| 23 | 2 | 34.3 |
| 24 | 2 | 40.45 |
| 25 | 2 | 35.1 |
| 26 | 2 | 38.4 |
| 27 | 2 | 36.8 |
| 28 | 2 | 34.9 |
| 29 | 2 | 35.1 |
| 30 | 2 | 29.8 |
| 31 | 2 | 43.4 |
| 32 | 2 | 39.9 |
| 33 | 2 | 31.2 |

EXAMPLE 36

This example illustrates the use of the compounds of Formula I as antioxidants.

The CERL Turbine Oil Oxidation test was carried out by incorporating into 150 Neutral Spindle Oil having a viscosity of 34.9 centistokes at 100° F. in a tube, 0.5% by weight of a compound of the Formula I based on the weight of oil and maintaining the oil at 122° C. for 7 days in the presence of metallic copper and a soluble copper salt (copper naphthenate), oxygen being passed through at a flow rate of 1 litre per hour. The insoluble sludge was filtered off, the tube was washed with chloroform and the chloroform extract evaporated off. The sludge was then weighed. The same procedure was followed but in the absence of a compound of Formula I. The results are as shown in Table VII.

TABLE VII

| Compound | Percent total sludge | | Acid value increase | |
|---|---|---|---|---|
| | Metallic | Soluble copper | Metallic | Soluble copper |
| No additive | 6.49 | 2.25 | 9.1 | 6.2 |
| Product of Example: | | | | |
| 5 | 0.79 | 0.89 | 2.1 | 2.5 |
| 24 | 0.96 | 0.71 | 2.7 | 1.9 |
| 31 | 0.50 | 0.55 | 3.1 | 2.5 |

What I claim is:

1. A compound having the formula

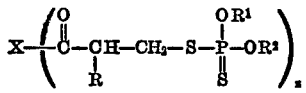
(I)

wherein R is hydrogen or an alkyl radical containing from 1 to 3 carbon atoms, $R^1$ and $R^2$ are the same or different may be alkyl having 1 to 20 carbon atoms, cycloalkyl having 5 to 8 carbon atoms, aryl or aralkyl having 6 to 20 carbon atoms which can be substituted by alkyl having 1 to 4 carbon atoms or halogen, z is an integer from 2 to 4, and X is an alkoxy radical derived from an aliphatic alcohol having from 2 to 20 carbon atoms and containing from 1 to 4 hydroxyl groups.

2. A compound of the Formula I wherein R is hydrogen, $R^1$ and $R^2$ are alkyl having 1 to 16 carbon atoms, cyclohexyl, phenyl or phenyl substituted by propyl, z is an integer from 2 to 4 and X is alkoxy derived from an alcohol having 4 to 6 carbon atoms and containing 2 to 4 hydroxyl groups.

3. A compound according to claim 1, wherein z is 2 and X is a divalent radical having the formula:

$$—OC_mH_{2m}O—$$ (III)

wherein m is 2 to 6 derived from ethylene glycol, 1,2-propylene glycol, 1,3-butylene glycol, 1,4-butylene glycol, 1,6-hexane diol and 2,2-dimethyl propane 1,3-diol.

4. A compound according to claim 1 wherein z is 3 and X is a trivalent radical having the formula:

(IV)

derived from trimethylol propane, trimethylol ethane or trimethylol methane.

5. A compound according to claim 1 wherein z is 4 and X is a tetravalent radical derived from pentaerythritol.

6. A compound according to claim 1 wherein z is 6 and X is a hexavalent radical derived from dipentaerythritol.

7. A compound according to claim 1 wherein $R^1$ and $R^2$ are the same, each being a methyl, ethyl, propyl, isopropyl, butyl, iso-octyl, capryl, isodecyl, tridecyl, cetyl, cyclopentyl, cyclohexyl, phenyl, benzyl, naphthyl, 2,4,6-tri-isopropyl, phenyl, 2,4,6-trichlorophenyl, p-chloro-phenyl or 2,4-diisopropyl phenyl grouping.

8. A compound according to claim 1 wherein $R^1$ and $R^2$ are different, one being an ethyl, propyl or isopropyl radical, and the other being an iso-octyl, isodecyl or capryl radical.

9. A compound having the formula:

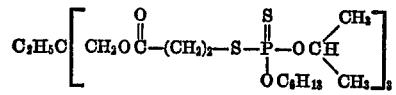

10. A compound having the formula:

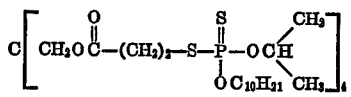

11. A compound having the formula:

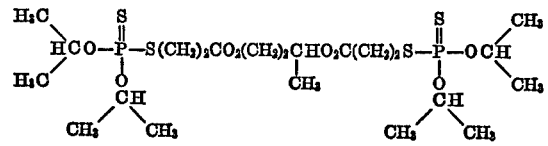

12. A compound having the formula:

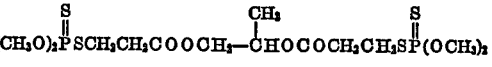

13. A compound having the formula:

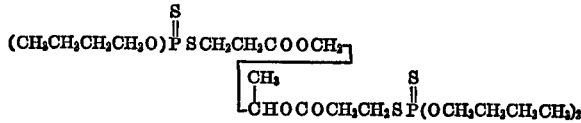

References Cited

UNITED STATES PATENTS 3,117,986   1/1964   Sehring et al. ____ 260—941 X

FOREIGN PATENTS 862,123   3/1961   Great Britain _____ 260—941

OTHER REFERENCES

O'Brien et al.: "Jou. Econ. Entomol.," vol. 51, No. 5 (1958), pp. 714–718.

ANTON H. SUTTO, Primary Examiner

U.S. Cl. X.R.

71—87; 252—46.6; 260—941; 424—205, 212